(12) United States Patent
Laxminarayan et al.

(10) Patent No.: US 9,280,766 B2
(45) Date of Patent: **\*Mar. 8, 2016**

(54) CASCADING DEFINITION AND SUPPORT OF EDI RULES

(75) Inventors: Chaitanya Laxminarayan, Austin, TX (US); Gopal Krishnan, Austin, TX (US); Sanjay Francis Kottaram, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1015 days.

This patent is subject to a terminal disclaimer.

(21) Appl. No.: 13/433,623

(22) Filed: Mar. 29, 2012

(65) Prior Publication Data

US 2012/0185423 A1 Jul. 19, 2012

Related U.S. Application Data

(63) Continuation of application No. 12/327,941, filed on Dec. 4, 2008, now Pat. No. 8,180,721, which is a continuation of application No. 11/232,839, filed on Sep. 22, 2005, now Pat. No. 7,475,051.

(60) Provisional application No. 60/612,140, filed on Sep. 22, 2004.

(51) Int. Cl.
*G06Q 20/14* (2012.01)
*G06Q 10/10* (2012.01)
*G06N 5/02* (2006.01)
*G06F 19/00* (2011.01)

(52) U.S. Cl.
CPC .................. *G06Q 20/14* (2013.01); *G06N 5/02* (2013.01); *G06Q 10/10* (2013.01); *G06F 19/328* (2013.01)

(58) Field of Classification Search
None
See application file for complete search history.

(56) References Cited

U.S. PATENT DOCUMENTS

| | | | |
|---|---|---|---|
| 5,481,647 A | 1/1996 | Brody et al. |
| 6,289,382 B1 | 9/2001 | Bowman-Amuah |
| 6,345,278 B1 | 2/2002 | Hitchcock et al. |
| 6,363,488 B1 | 3/2002 | Ginter et al. |
| 6,389,402 B1 | 5/2002 | Ginter et al. |
| 6,473,794 B1 | 10/2002 | Guheen et al. |
| 6,640,249 B1 | 10/2003 | Bowman-Amuah |
| 6,658,568 B1 | 12/2003 | Ginter et al. |
| 6,721,713 B1 | 4/2004 | Guheen et al. |
| 6,741,975 B1 | 5/2004 | Nakisa et al. |
| 6,836,890 B1 | 12/2004 | Watts et al. |
| 6,868,441 B2 | 3/2005 | Greene et al. |
| 6,951,008 B2 | 9/2005 | Quaile |

(Continued)

*Primary Examiner* — Stanley K Hill
*Assistant Examiner* — Ilya Traktovenko
(74) *Attorney, Agent, or Firm* — Stevens & Showalter, LLP

(57) ABSTRACT

Electronic data interchange (EDI) documents are validated by creating an inventory of all rules, dynamically adjusting the inventory based upon entity specific rules derived from a plurality of companion guides, determining a profile containing pointers to select rules in the inventory for each companion guide and storing the profile for each companion guide in a storage. A runtime checker can then be used to check a received EDI document with a corresponding rule set, forward the EDI document if the EDI document matches its current rule set and return the EDI document if the EDI document does not match its current rule set. EDI rules may be enforced, for example, by determining entity-specific rules from corresponding companion guides, by expressing each rule in a neutral and machine readable format, by classifying the rules and/or by creating an inventory of rules and pointers to entity-specific rules.

20 Claims, 7 Drawing Sheets

(56) References Cited

U.S. PATENT DOCUMENTS

| | | |
|---|---|---|
| 6,966,053 B2 | 11/2005 | Paris et al. |
| 7,031,951 B2 | 4/2006 | Mancisidor et al. |
| 7,051,243 B2 | 5/2006 | Helgren et al. |
| 7,058,886 B1 | 6/2006 | Sulistio et al. |
| 7,100,082 B2 | 8/2006 | Little et al. |
| 7,146,536 B2 | 12/2006 | Bingham et al. |
| 7,475,051 B1 | 1/2009 | Laxminarayan et al. |
| 8,180,721 B2 | 5/2012 | Laxminarayan et al. |
| 2002/0165841 A1 | 11/2002 | Quaile |
| 2003/0046639 A1 | 3/2003 | Fai et al. |
| 2003/0084203 A1 | 5/2003 | Yoshida et al. |
| 2003/0121001 A1 | 6/2003 | Jeannette et al. |
| 2003/0130945 A1 | 7/2003 | Force et al. |
| 2003/0144967 A1 | 7/2003 | Zubeldia et al. |
| 2003/0220855 A1 | 11/2003 | Lam et al. |
| 2003/0236754 A1 | 12/2003 | Thompson |
| 2004/0083199 A1 | 4/2004 | Govindugari et al. |
| 2004/0255281 A1 | 12/2004 | Imamura et al. |
| 2005/0187872 A1 | 8/2005 | Schmidt et al. |
| 2005/0262008 A1 | 11/2005 | Cullen et al. |
| 2005/0262130 A1 | 11/2005 | Mohan |
| 2006/0100905 A1 | 5/2006 | Christen |
| 2006/0155725 A1 | 7/2006 | Foster et al. |

CASCADING DEFINITION AND SUPPORT OF EDI RULES

CROSS REFERENCE TO RELATED APPLICATIONS

This application is a continuation of U.S. patent application Ser. No. 12/327,941, entitled Cascading Definition and Support of EDI Rules, filed Dec 4, 2008, now U.S. Pat. No. 8,180,721, which is a continuation of U.S. Ser. No. 11/232,839, entitled System and Method for the Cascading Definition And Enforcement Of EDI Rules, filed Sep 22, 2005, now U.S. Pat. No. 7,475,051, which claims the benefit of U.S. Provisional Application Ser. No. 60/612,140, filed Sep 22, 2004, the entire disclosures of which are incorporated by reference herein.

BACKGROUND

For speed of communications and cost effectiveness, individuals, businesses, and other organizations frequently exchange electronic data through e-mail, the Internet, and other networks and systems. Companies increasingly rely on third-party applications on the Internet to accomplish a wide range of intended purposes, often involving the exchange of electronic documents.

Electronic Data Interchange (EDI)

To help establish compatibility for electronic data exchanges, the American National Standards Institute (ANSI) Accredited Standards Committee (ASC) has developed a set of standards for electronic data interchange (EDI) called the X12 standards, which defines the content and structure for data contained in electronic data files. For example, in EDI X12, a standard HIPAA (Health Insurance Portability and Accountability Act) "837P" interchange document represents an electronic data file used for filing patient claims to a health insurer.

Example of an EDI Document

An EDI document is a flat list of text, the divisions of which are not easy to determine. The following, abbreviated code shows a typical EDI interchange document:

```
ISA*00*  *00*    *ZZ*WEBIFYSE   *ZZ*00AAA
*020220*1243*U*00401*100000034*0*T*:~GS*HS*WEBIFYSE*00AAA*20020220*2314
*123456789*X*004010X092Al~ST*270*3120~BHT*0022*13*10001234*19990501*103045
*RT~HL*1**20*1~NM1*PR*2*Sample
BCBS*****FI*999999999~HL*2*1*21*1~NM1*1P*2*Sample
Clinic*****FI*888888888~REF*1J*0035~HL*3*2*22*0~TRN*1*93175-
012547*9323233345~NM1*IL*1*SMITH*JOHN*M***MI*333440623~DMG*D8*19510918
~DTP*472*RD8*20031201-
20031201~EQ*30**FAM*GP~SE*14*3120~GE*1*123456789~IEA*1*100000034~
```

In this interchange document, the elements ST and SE represent the start and end of a business transaction that may contain many additional elements.

An EDI document may be associated with more than one entities.

Example of EDI Transaction Segment

The following line shows a typical segment of an EDI business transaction in an 837P interchange document:

NM1*H*DOE*JOHN*78747

In this example, the letters "DOE" might represent the last name of a specific individual. The field where "DOE" appears might indicate the last name of a patient submitting a claim. Similarly, the numbers "78747" might represent a specific individual's zip code and the field where "78747" appears might indicate the zip code of a patient filing a claim.

Implementation Guides

To promote standardization in the formats used in EDI documents, the Workgroup for Electronic Data Interchange (WEDI) organization has created implementation guides of standard rules. For example, the implementation guide for an EDI document might stipulate that for NM 1, a valid zip code of five characters needs to exist. An implementation guide requirement for a different part of the same EDI document might be that a payer identification number needs to be 45 characters long.

Companion Guides

Implementation guides, however, do not cover the different, often changing requirements of regulatory bodies and individual companies. For example, the states of Florida and Texas would require different ranges of zip code numbers in patient claims. The American Medical Association may have guidelines for patient claims that change over time. And requests to different companies would, of course, require different company names or payer identification numbers. If a company changes its name, a different name or identification number might have to be supplied in patient claims.

To be able to use the EDI documents they receive, companies therefore typically create rulebooks, for example companion guides, to be used on top of implementation guides, to stipulate their particular requirements and the requirements of the bodies that govern them. In FIG. 1, for example, the company at payer server 1 170 may have companion guide 1 410. The company at payer server 2 180 may have a different companion guide 420.

Companion guides, which are usually PDF files, are not machine readable, and each, may contain thousands of rules, making them difficult to read and comply with. For example, with over 600 insurance companies in the United States alone, companies that have to send EDI documents to numerous insurance companies have great difficulty identifying and meeting all the requirements in different companion guides. Moreover, other types of EDI documents in other areas of business have similar implementation guides and companion guides for different companies services, so that that challenge of interoperability through different industries is quite large.

Clearing Houses

Business entities, such as health insurance payers, often use third party clearing houses to validate that the EDI documents being sent to the entities from companies such as health care providers comply with the entities' rulebooks or companion guides.

Typically these clearing houses manually write programs or use manually programmed third party engines to identify the requirements in each companion guide and then to automatically analyze each EDI document to discover whether the EDI document meets the requirements of the appropriate companion guide. Such a process is unnecessarily laborious, expensive, and time consuming, because the rules shared among many companion guides have to be written many times.

Therefore there is a need for a method and system that provides a more automatic method to validate the compliance of EDI documents with companion guides.

BRIEF SUMMARY

According to various aspects of the present invention, computer program products and systems are provided to validate a plurality of electronic data interchange (EDI) documents, where each EDI document is associated with at least one of a plurality of entities.

Aspects of the present invention relate to a system for validating EDI documents that includes computer system having a processor, a memory, a storage device, a network interface, and a bus for exchanging information therebetween. In particular, the memory stores computer usable program code executed by the processor to a) provide an inventory of all rules, the inventory including a common set of rules for a plurality of entities; b) dynamically adjust the inventory of all rules based upon entity specific rules where the entity specific rules are derived from a plurality of companion guides, each companion guide associated with one of the plurality of entities; and c) create a rules analyzer to analyze content of the plurality of companion guides and to build an organizer of companion guide rules. The memory further stores additional computer usable program code that is executed by the processor to employ the organizer of companion guide rules to add companion guide rules to the inventory of all rules; create a profiles engine to create a respective, current rule set for each of said plurality of entities; and to create a companion guide profile for each of the plurality of entities where each companion guide profile indicates that entity's companion guide rules and provides pointers to the rules in the inventory of all rules that are associated with the respective, current rule set of that entity. Ultimately the system creates a runtime checker engine to validate an EDI document by comparing the EDI document to the respective, current rule set associated with a corresponding one of the plurality of entities, by forwarding the EDI document to the corresponding one of the plurality of entities if the EDI document matches its current rule set, wherein the EDI document is validated and by returning the EDI document to a sender if the EDI document does not match the respective, current rule set, wherein the EDI document is invalidated. The computer usable program code of this system can be embodied on a computer readable storage medium as well in order to provide a corresponding computer program product.

Additional aspects of the present invention relates to a system for determining EDI rules to enforce. In particular, the system includes a computer system having a processor, a memory, a storage device, a network interface, and a bus for exchanging information therebetween. More particularly, the memory stores computer usable program code that is executed by the processor to a) determine entity-specific rules from corresponding companion guides for each of a plurality of entities; b) express each entity-specific rule in a neutral and machine readable format; c) classify each of the entity-specific rules; and d) convey results of classifying the entity-specific rules. In particular, classifying each of the entity-specific rules, includes determining for each entity-specific rule whether the entity-specific rule is common with at least one other entity-specific rule, or whether the entity-specific rule is similar to at least one other entity-specific rule, or whether the entity-specific rule is unique. Also, conveying the results of classifying the entity-specific rules includes creating an inventory of rules, the inventory including a common set of rules for the plurality of entities; dynamically adjusting said inventory of the rules based upon the entity-specific rules where the entity specific rules are derived from a plurality of companion guides, each companion guide associated with one of the plurality of entities; storing the inventory of rules in a storage according to the classification of each rule as common, similar, or unique; creating a respective, corresponding pointer to the entity-specific rules in the inventory of rules associated with at least one of the plurality of entities; and storing the corresponding pointer in a storage for use in retrieving an appropriate current rule set when validating an EDI document for the at least one of the plurality of entities. The computer usable program code of this system can be embodied on a computer readable storage medium as well in order to provide a corresponding computer program product.

BRIEF DESCRIPTION OF SEVERAL VIEWS OF THE DRAWINGS

The following embodiment of the present invention is described by way of example only, with reference to the accompanying drawings, in which.

DETAILED DESCRIPTION

The following description explains a system to provide an automatic method to validate the compliance of EDI documents with rulebooks such as companion guides. The details of this explanation are offered to illustrate the present invention clearly. However, it will be apparent to those skilled in the art that the concepts of present invention are not limited to these specific details. Commonly known elements are also shown in block diagrams for clarity, as examples and not as limitations of the present invention.

Operating Environment

Figure 1:
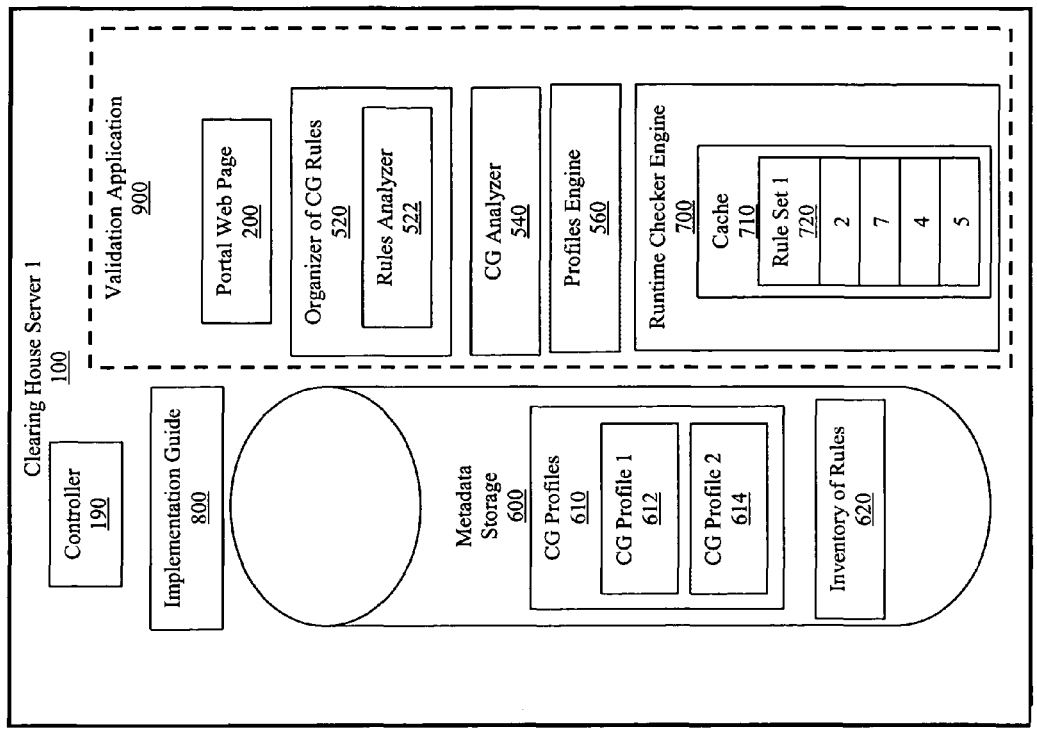
FIG. 1 is a block diagram showing an operating environment in which embodiments of the present invention may be employed.
Figure 1:
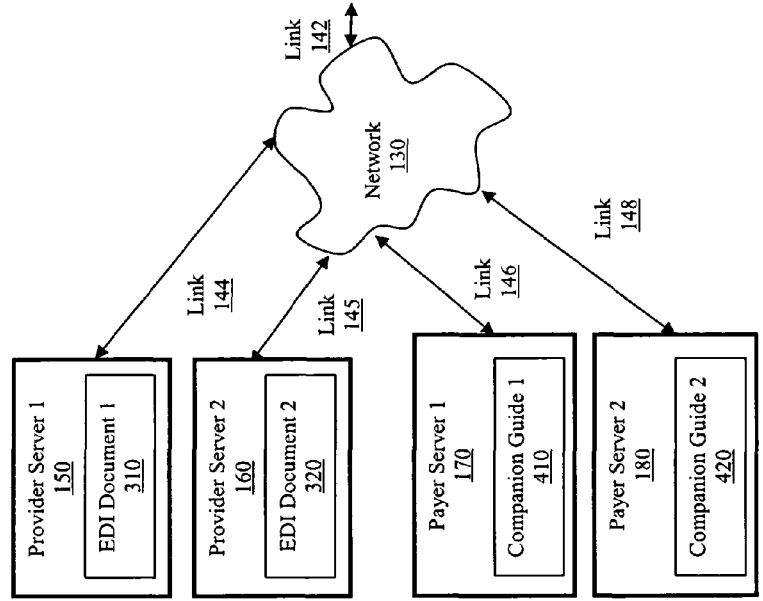

An embodiment of the operating environment of the present invention is shown in FIG. 1. A party uses server 1 100 to operate a clearing house service for providers such as provider server 1 150 and provider server 2 160 and entities such as payer server 1 170 and payer server 2 180.

Payer 1 170 has companion guide 1 410 that stipulates its particular requirements for EDI documents and the requirements of the bodies that govern it. In the same way, payer server 2 180 has companion guide 2 420.

Provider server 1150 has EDI document 1 310 and provider server 2 160 has EDI document 2 320.

Server 100 can communicate with servers 150, 160, 170, and 180 via a wired or wireless link 142, a wired or wireless network 130, and wired or wireless links 144, 145, 146, and 148. The servers 100, 150, 160, 170, and 180 may be personal computers or larger computerized systems or combinations of systems.

The network 130 may be the Internet, a private LAN (Local Area Network), a wireless network, a TCP/IP (Transmission Control Protocol/Internet Protocol) network, or other communications system, and can comprise multiple elements such as gateways, routers, and switches. Links 142, 144, 145, 146, and 148 use technology appropriate for communications with network 130.

Through the operating environment shown in FIG. 1, a clearing house service at server 1 100 can be used to validate that EDI documents, such as 310 and 320, sent from providers, such as 170 and 180, comply with payers' companion guides, such as companion guide 1 410 and companion guide 2 420 and the rules of the associated implementation guide.

Process

Figure 2:
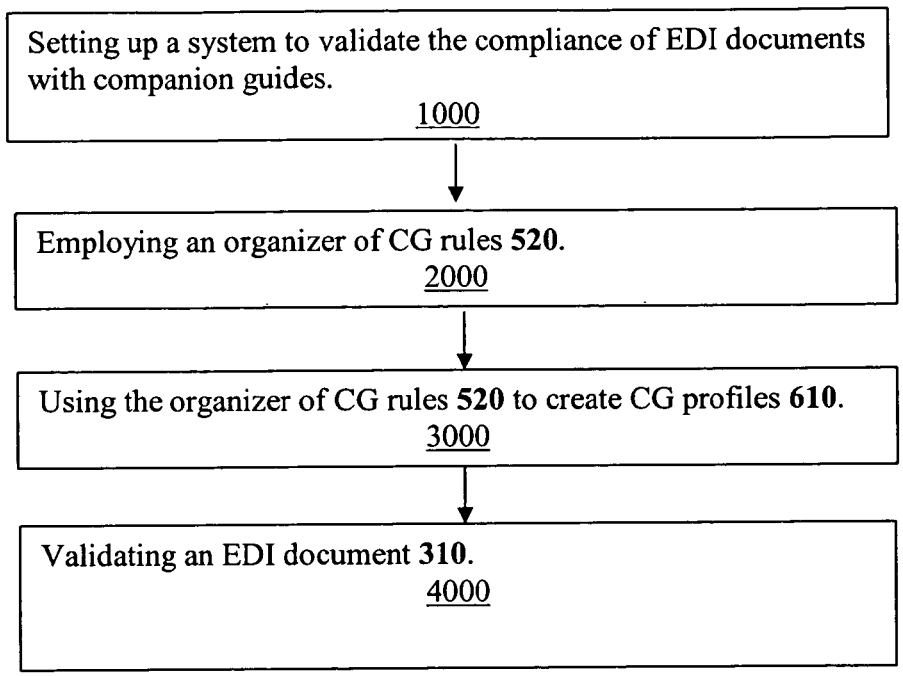
FIG. 2 is a flow chart showing a process for validating the compliance of EDI documents with companion guides.

The following discussion explains an embodiment of a process to validate the compliance of EDI documents with companion guides. As shown in FIG. 2, the process employs the following main steps:

Step 1000 in FIG. 2—Setting up a system to validate the compliance of EDI documents with companion guides;

Step 2000 in FIG. 2—Employing an organizer of CG rules 520 to add rules to the inventory of rules 620;

Step 3000 in FIG. 2—Using the organizer of CG rules 520 to create CG profiles 610;

Step 4000 in FIG. 2—Validating an EDI document 310.

Figure 3A:
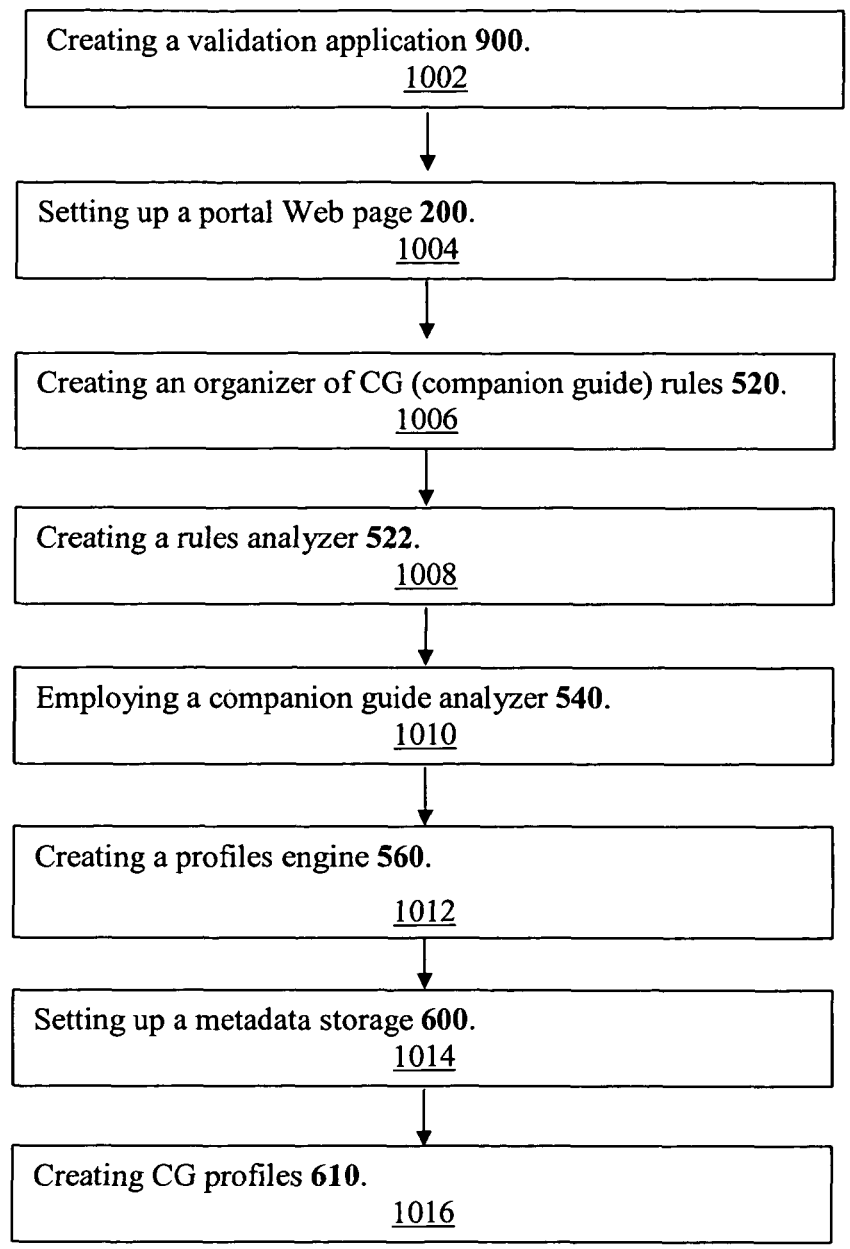
FIGS. 3A and 3B are flow charts showing a process for setting up a system to validate the compliance of EDI Documents with companion guides.
Figure 3B:
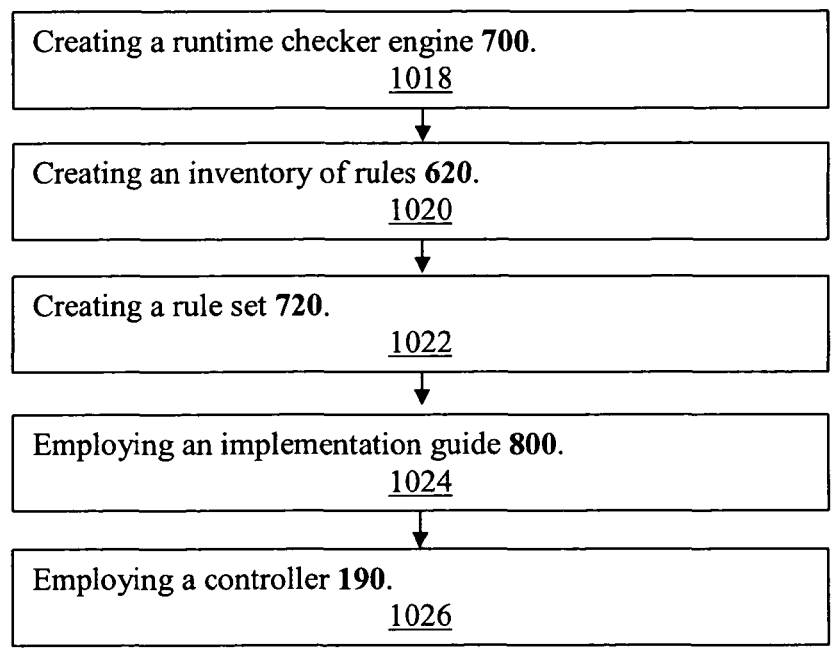

Setting Up a System to Validate the Compliance of EDI Documents with Companion Guides An embodiment of a process for setting up a system on server 100, shown in FIG. 1, to validate the compliance of EDI Documents with companion guides is shown in FIG. 3A and FIG. 3B.

Step 1002 in FIG. 3A—Creating a validation application 900.

A validation application 900 is a proprietary software program used to validate the compliance of an EDI document with a payer's companion guide 410. For the data transfers in this process, validation application 900 uses a controller 190.

Step 1004 in FIG. 3A—Setting up a portal Web page 200.

A portal Web page 200 is a Web page that payers can access to review and modify their CG profiles 610, as explained below.

Step 1006 in FIG. 3A—Creating an organizer of CG (companion guide) rules 520.

An organizer of CG rules 520 is a proprietary software program that contains human-readable hierarchies of rules from companion guides and their associated implementation guide and that is used for efficiently creating CG profiles 610 for payers.

Step 1008 in FIG. 3A—Creating a rules analyzer 522.

A rules analyzer 522 is a proprietary software program used by the organizer of CG rules 520 to help analyze the content of companion guides 410 and 420 and to build an organizer of CG rules 520.

Step 1010 in FIG. 3A—Employing a companion guide analyzer 540.

In an embodiment, a companion guide (CG) analyzer 540 is a human operator who uses the organizer of CG rules 520 and his or her own efforts to analyze companion guides 410 and 420 for common and different rules and uses this information to create and update the entries in the inventory of rules 620. In another embodiment, a companion guide analyzer 540 may comprise a fully automated software program.

Step 1012 in FIG. 3A—Creating a profiles engine 560.

A profiles engine 560 is a proprietary software program used to create a current rule set 720 for a payer.

Step 1014 in FIG. 3A—Setting up a metadata storage 600.

A metadata storage 600 may comprise non-volatile storage used to store CG profiles 610 and an inventory of rules 620.

Step 1016 in FIG. 3A—Creating CG profiles 610.

CG profiles 610 are one or more files 612 and 614 that indicate payers' companion guide rules and the associated implementation guide rules, providing pointers to the rules stored in the inventory of rules 620, which is described below.

Step 1018 in FIG. 3B—Creating a runtime checker engine 700.

A runtime checker engine 700 is a proprietary software program used to validate an EDI document such as 310 by comparing it to the current rule set 720 and CG profile 612 for a payer's companion guide 410.

Step 1020 in FIG. 3B—Creating an inventory of rules 620.

An inventory of rules 620 is a proprietary software program that contains all the rules defined by the organizer of CG rules 520.

Step 1022 in FIG. 3B—Creating a rule set 720.

In an embodiment, a rule set 720 is an instance in a cache 710 that shows the current set of rules required by a payer's companion guide 410. A rule set 720 is created by the profiles engine 560 the first time a CG profile 612 is accessed during the validation process and is used subsequently each additional time that CG profile 612 is accessed. Each time CG profile 612 is updated, a new rule set 720 is created, which becomes the current rule set.

Step 1024 in FIG. 3B—Employing an implementation guide 800.

An implementation guide 800 is a set of standard rules for EDI documents in an industry and is available from the WEDI Web site.

Step 1026 in FIG. 3B—Employing a controller 190.

A controller 190 is a software program that controls data transfers for validation application 900.

In other embodiments, these elements may be located separately in more widely dispersed systems involving multiple servers. Moreover, in another embodiment these elements could be located on a payer's server 170, shown in FIG. 1, and the validation process could be carried out by the payer and without a clearing house.

Employing an Organizer of CG Rules 520

Figure 4:
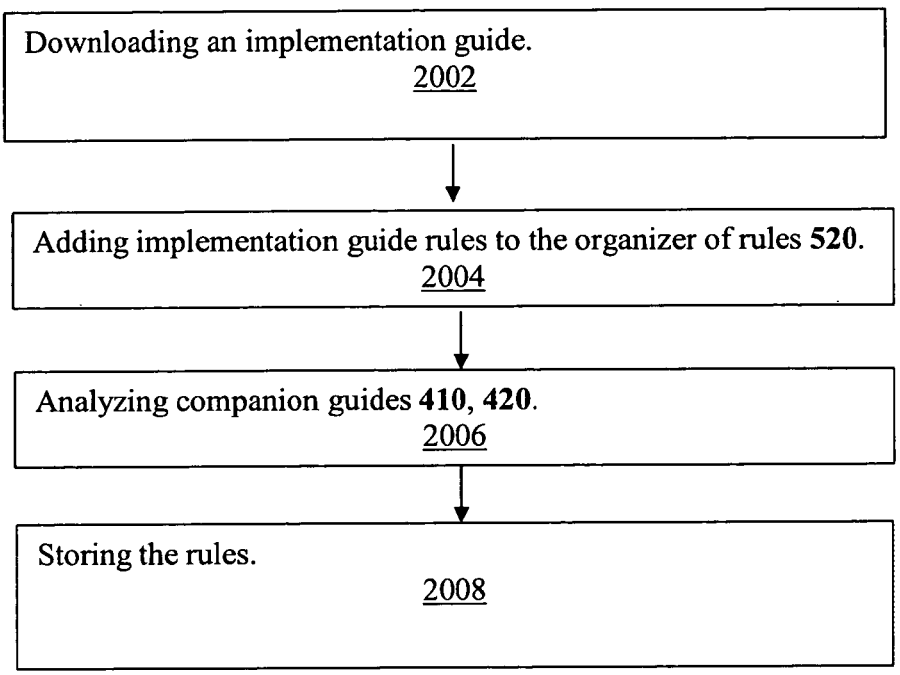
FIG. 4 is a flow chart showing a process for employing an organizer of CG rules.

FIG. 4 shows an embodiment of a process for employing an organizer of CG rules 520.

Step 2002 in FIG. 4—Downloading an implementation guide.

In an embodiment, the clearing house at server 100, shown in FIG. 1, downloads an electronic copy of an implementation guide 800 for a specific industry, such as health care insurance, from the WEDI Web site.

Step 2004 in FIG. 4—Adding implementation guide rules to the organizer of rules 520. The validation application 900 uses the CG analyzer 540 to add the rules from the implementation guide 800 to the organizer of CG rules 520. For the example, if the implementation guide 800 contains 1000 rules, these 1000 rules will form the base content of the organizer of CG rules 520.

Step 2006 in FIG. 4—Analyzing companion guides 410, 420.

Subsequently, the clearing house at server 100 receives a copy of a companion guide 1 410 from payer server 1 170 in electronic form. Validation application 900 then uses the rules analyzer 522 and the companion guide analyzer 540 to analyze the contents of companion guide 410 for the following contents in comparison with the content of the organizer of CG rules 520:

Content not found

Similar content

Identical content

For example, companion guide 1 410 may contain 10 new rules not covered in the 1000 rules from the implementation guide 800. The rules analyzer 522 and the companion guide analyzer 540 thus add the 10 new rules to the organizer of CG rules 520. The current organizer of CG rules 520 then contains 1010 rules.

Later, the clearing house at server 100 receives a copy of companion guide 2 420 from payer server 2 180 in electronic form. Validation application 900 then uses the rules analyzer 522 and the companion guide analyzer 540 to analyze the contents of companion guide 2 420 in comparison with the current contents of the organizer of CG rules 520. For example, companion guide 2 420 may use only five of the ten new rules found in companion guide 1 410 and two new rules in addition. The rules analyzer 522 and the companion guide analyzer 540 thus add the two new rules from companion guide 2 420, so that the current organizer of CG rules 520 contains 1012 rules. The same process continues with any additional companion guides that the clearing house at server 100 receives.

Example—Entities with Common, Similar, and Unique Rules

The following example illustrates one embodiment of a rules analyzer portion of the current invention.

In this example, there are 600 entities designated as $e_1$, $e_2$, $e_3$ $_e$ . . . $e_{600}$. Each entity has about 200 rules. Entity $e_1$ has 200 rules, entity $e_2$ has 195 rules, entity $e_3$ has 202 rules, and $e_{600}$ has 200 rules.

The table below shows a small portion of the approximately 120,000 rules set from all entities and all rules. The first column "reference" is used for discussion of this example. The second column "rule" is designated as $e_i r_j$ where "i" represents an entity and "j" represents a particular rule.

| Reference | Rule | Description |
|---|---|---|
| 1 | $e_1 r_1$ | X > 50 |
| 2 | $e_1 r_2$ | Y = 'abc' |
| . . . | | |
| 200 | $e_1 r_{200}$ | AA = 1800 |
| 201 | $e_2 r_1$ | X > 50 |
| 202 | $e_2 r_2$ | Y = 'def' |
| . . . | | |
| 395 | $e_2 r_{195}$ | BB = 2000 |
| 396 | $e_3 r_1$ | X > 50 |
| 397 | $e_3 r_2$ | Y = 'ghi' |
| . . . | | |
| 597 | $e_3 r_{202}$ | Z = 100 |
| . . . | | |
| 119,801 | $e_{600} r_1$ | X > 50 |
| 119,802 | $e_{600} r_2$ | Y = 'rstuv' |
| . . . | | |
| 119,999 | $e_{600} r_{199}$ | Z = 100 |
| 120,000 | $e_{600} r_{200}$ | CC = 2100 |

In this example, the number of rules can be dramatically decreased to facilitate rules checking and update functions.

Expressing the Rules in a Neutral Format

The rules are first put into a neutral format that is machine readable so that they can be further processed.

Classifying and Categorizing the Rules

Many of the rules are "common" for two or more entities, such as reference numbers (1, 201, 396, 119801) and (597, 119999).

Many rules are "similar" where the rule structure is the same, but the values differ, such as (2, 202, 397, 119802).

Rules which are not common or similar are "unique", such as (200, 395, 120000).

By grouping the rules according to common, similar, and unique rules, the number of entries may be reduced from 120,000 to perhaps less than 50,000 rules. The table below shows a grouping of rules where the "Ref" column is for discussion of the example.

In the table, Ref A is for a common rule shared by entities $e_1$, $e_2$, $e_3$, and $e_{600}$.

Ref B is for a common rule shared by entities $e_3$ and $e_{600}$.

Ref C is for a similar rule of entities $e_1$, $e_2$, $e_3$, and $e_{600}$.

Ref D, E, and F are for unique rules of entities $e_1$, $e_2$, and $e_{600}$, respectively.

This arrangement is one of many different ways to compile the rules in a rules analyzer. Once the rules are compiled, then all rules for an entity can be determined, such as by a column in the table below. The table also provides an improved method of updating rules to provide a current rule set. For instance if reference rule 202 ($e_2 r_2$) changed from Y='def' to Y='lmnp', the single entry at Ref C may be changed to update the table.

| | | Entity | | | | |
|---|---|---|---|---|---|---|
| Ref | Desc | $e_1$ | $e_2$ | $e_3$ | . . . | $e_{600}$ |
| A | X > 50 | * | * | * | | * |
| B | Z = 100 | | | * | | * |
| C | Y | 'abc' | 'def' | 'ghi' | | 'rstuv' |
| D | AA | 1800 | | | | |
| E | BB | | 2000 | | | |
| F | CC | | | | | 2100 |

Step 2008 in FIG. 4—Storing the rules.

The organizer of CG rules 520 stores in the inventory of rules 620 all the rules it has identified.

After its initial creation, the organizer of CG rules 520 can thus serve as a dynamic base for efficiently analyzing all new companion guides sent to the clearing house at server 100, so that programmers do not have to manually create an entirely new set of rules for each new companion guide but only have to add the rules not previously covered. Moreover, the organizer of CG rules 520 may be sent to other servers for use with other systems.

In other embodiments the clearing house at server 100 can receive hard copy companion guides in hard copy format and scan them into electronic format.

In addition, multiple organizers of CG rules 520 may be created from the implementation guides and companion guides of separate industries, for example the health insurance and financial industries.

Using the Organizer of CG Rules to Create CG Profiles

After the organizer of CG rules 520 has been created, the organizer of CG rules 520 efficiently creates a CG (companion guide) profile such as 612 for each companion guide that has been analyzed through the process described above. CG profile 612 identifies all the rules employed by its associated companion guide 410 and is stored in metadata storage 600.

After a CG profile 610 has been created, the associated payer can use the portal Web page 200 to update the CG profile 610.

It is important to note that CG profile 612 contains pointers to those rules stored in the inventory of rules 620 that are used in companion guide 410 and not the actual code for the rules. Take, for example, the case where companion guide 1 410 contains 10 new rules in addition to the 1000 rules from the implementation guide 800. CG profile 612 then would contain pointers to the code for Rule 1, Rule 2, etc.,—all the way to Rule 1010, which is stored in the inventory of rules 620.

Continuing the example given above, companion guide 2 420 uses the 1000 rules of implementation guide 800, only five of the ten new rules found in companion guide 1 410, and two new rules in addition. The corresponding CG profile 614 for companion guide 2 412 may then contain pointers to the code for Rule 1, Rule 2, etc,—all the way to Rule 1000, for Rules 1005-1010, and for Rules 1011 and 1012, which is stored in the inventory of rules 620.

Thus, when subsequent content changes are made to the fields for rules contained in the implementation guide and companion guides, the organizer of CG rules 520 can be used to easily and efficiently update the rules stored in the inventory of rules 520 without having to update individual CG profiles, whose pointers remain accurate. This makes the process of managing the large number of rules, and the changing nature of the rules, associated with implementation guides and companion guides much more manageable.

Validating an EDI Document

Figure 5:
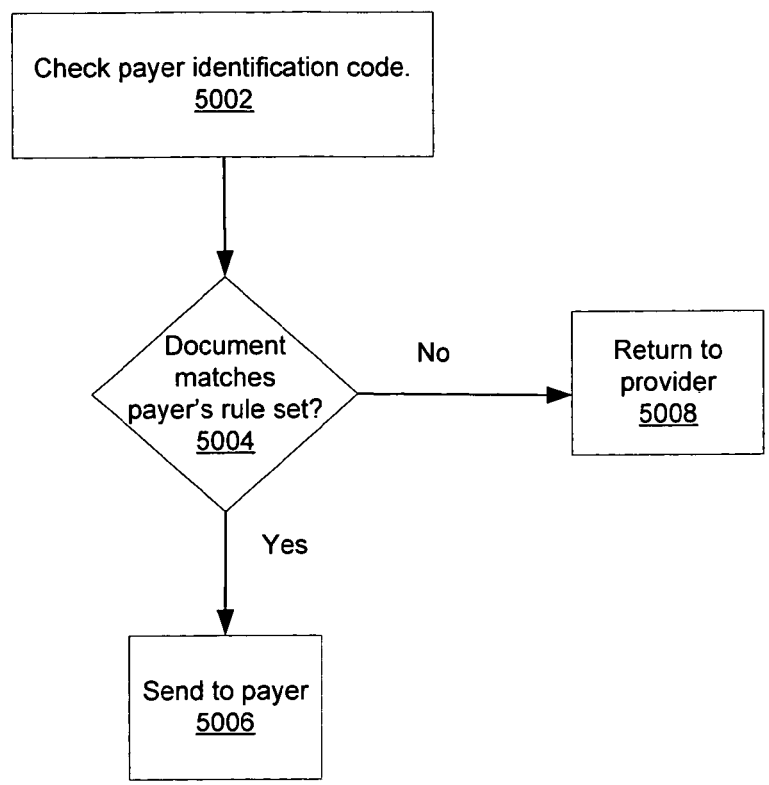
FIG. 5 is a flow chart showing a process for using a rule set to validate an EDI document.

FIG. 5 shows an embodiment of a process for using a rule set 720 to validate an EDI document 310.

Step 5002 in FIG. 5—Check the payer identification code.

After an EDI document such as 310 reaches the clearing house at server 100, the runtime checker engine 700 reads the payer identification code in the EDI document 310 and checks metadata storage 600 for a current rule set 720 for the payer.

In an embodiment, a rule set 720 is a file stored in cache 710, which shows the current set of rules required by a payer's companion guide 410. A rule set 720 is created by the profiles engine 560 the first time a CG profile 612 is accessed during the validation process and is used subsequently each additional time that CG profile 612 is accessed. Each time a CG profile 612 is updated, the profiles engine 560 creates and stores a new rule set 720 for the CG profile 612, and that new set becomes the current rule set 720.

Step 5004 in FIG. 5—Document matches payer's rule set?

The runtime checker engine 700 then attempts to validate the EDI document 310 by comparing it to the current rule set 720 for a payer's companion guide 410.

Step 5006 in FIG. 5—Send to payer.

If the EDI document 310 matches the rule set 720, the validation application 900 validates the EDI document 310 and sends it to the payer 170.

Step 5008 in FIG. 5—Return to provider.

If the EDI document 310 does not match the rule set 720, the validation application 900 invalidates the EDI document 310 and sends it back to the provider 150.

Computer System Overview

Figure 6:
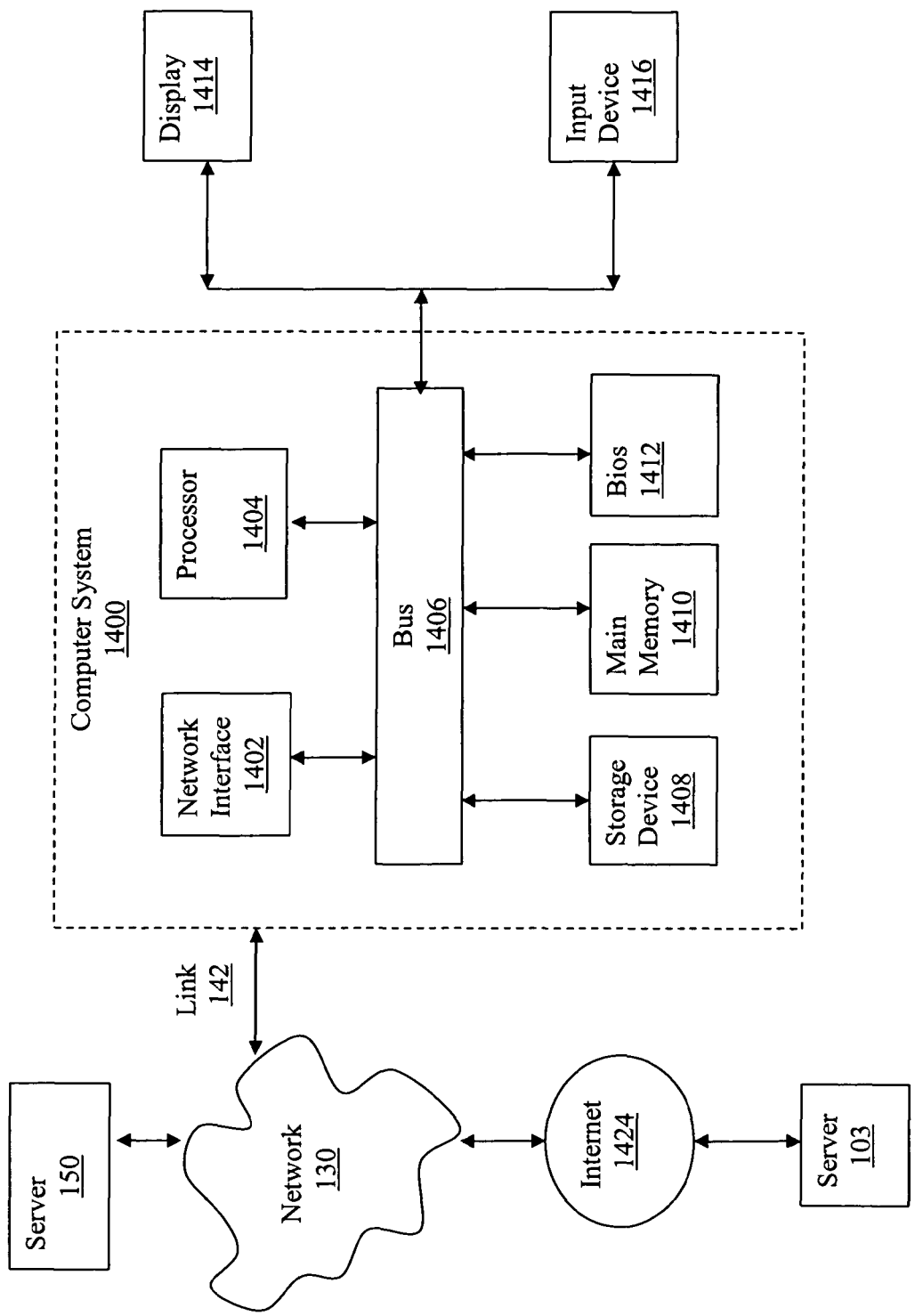
FIG. 6 is a block diagram that illustrates a typical computer system, representing a server on which embodiments of the present invention can be implemented.

FIG. 6 is a block diagram that illustrates a typical computer system 1400, well known to those skilled in the art, representing a server 100, shown in FIG. 1, on which embodiments of the present invention can be implemented. This computer system 1400, shown in FIG. 6, comprises a network interface 1402 that provides two-way communications through a wired or wireless link 142 to a wired or wireless communications network 130 that uses any applicable communications technology. For example, the network 130 can comprise a public telephone network, a wireless network, a local area network (LAN), and any known or not-yet-know applicable communications technologies, using correspondingly applicable links. The network 130 in turn provides communications with one or more host computers 150 and, through the Internet 1424, with one or more servers 103.

The network interface 1402 is attached to a bus 1406 or other means of communicating information. Also attached to the bus 1406 are the following:

a processor 1404 for processing information;

a storage device 1408, such as an optical disc, a magneto-optical disc, or a magnet disc, for storing information and instructions;

main memory 1410, which is a dynamic storage device such as a random access memory (RAM) that stores information and instructions to be carried out by processor 1404;

a bios 1412 or another form of static memory such as read only memory (ROM), for storing static information and instructions to be carried out by processor 1404;

a display 1414, such as a liquid crystal display (LDC) or cathode ray tube (CRT) for displaying information to user of the computer system 1400; and an input device 1416, with numeric and alphanumeric keys for communicating information and commands to processor 1404. In another embodiment a mouse or other input devices can also be used.

The computer system 1400 is used to implement the methods of the present invention in one embodiment. However, embodiments of the present invention are not limited to specific software and hardware configurations. Computer system 1400 can receive data from computer 150 and server 103 through a network 130 such as the Internet, and appropriate links 142, such as wired or wireless ones, and its network interface 1402. It can of course transmit data back to computers over the same routes.

Computer system 1400 carries out the methods of the present invention when its processor 1404 processes instructions contained in its main memory 1410. Another computer-readable medium, such as its storage device 1408, may read these instructions into main memory 1410 and may do so after receiving these instructions through network interface 1402. Processor 1404 further processes data according to instructions contained in its storage device 1408. Data is relayed to appropriate elements in computer system 1400 through its bus 1406. Instructions for computer system 1400 can also be given through its input device 1416 and display 1414.

"Computer-readable medium" refers to any medium that provides instructions to processor 1404, comprising volatile, non-volatile, and transmission media. Volatile media comprise dynamic memory, such as main memory 1410. Non-volatile media comprise magnetic, magneto-optical, and optical discs, such as storage device 1408. Transmission media comprise a wide range of wired and unwired transmission technology, comprising cables, wires, modems, fiber optics, acoustic waves, such as radio waves, for example, and light waves, such as infrared, for example. Typical examples of widely used computer-readable media are floppy discs, hard discs, magnetic tape, CD-ROMs, punch cards, RAM, EPROMs, FLASH-EPOMs, memory cards, chips, and cartridges, modem transmissions over telephone lines, and infrared waves. Multiple computer-readable may be used, known and not yet known, can be used, individually and in combinations, in different embodiments of the present invention.

Alternate Embodiments

It will be apparent to those skilled in the art that different embodiments of the present invention may employ a wide range of possible hardware and of software techniques. For example the communication between servers could take place through any number of links, including wired, wireless, infrared, or radio ones, and through other communication networks beside those cited, including any not yet in existence.

Also, the term computer is used here in its broadest sense to include personal computers, laptops, telephones with computer capabilities, personal data assistants (PDAs) and servers, and it should be recognized that it could include multiple servers, with storage and software functions divided among the servers. A wide array of operating systems, compatible e-mail services, Web browsers and other communications systems can be used to transmit messages among servers.

Furthermore, in the previous description the order of processes, their numbered sequences, and their labels are presented for clarity of illustration and not as limitations on the present invention.

The invention claimed is:

1. A system for determining EDI rules to enforce, comprising:
   a computer system having a processor, a memory, a storage device, a network interface, and a bus for exchanging information therebetween, the memory storing computer usable program code executed by the processor to:
      determine entity-specific rules from corresponding companion guides for each of a plurality of entities;
      express each entity-specific rule in a neutral and machine readable format;
      classify each of the entity-specific rules by determining for each entity-specific rule:
         whether the entity-specific rule is common with at least one other entity-specific rule, or
         whether the entity-specific rule is similar to at least one other entity-specific rule, or
         whether the entity-specific rule is unique;
      convey results of classifying the entity-specific rules by:
         creating an inventory of rules, the inventory including a common set of rules for the plurality of entities;
         dynamically adjusting said inventory of the rules based upon the entity-specific rules where the entity specific rules are derived from a plurality of companion guides, each companion guide associated with one of the plurality of entities;
         storing the inventory of rules in a storage according to the classification of each rule as common, similar, or unique;
         creating a respective, corresponding pointer to the entity-specific rules in the inventory of rules associated with at least one of the plurality of entities; and
         storing the corresponding pointer in a storage for use in retrieving an appropriate current rule set when validating an EDI document for the at least one of the plurality of entities.

2. The system of claim 1, wherein the memory further stores computer usable program code executed by the processor to:
   determine a first current rule set for a first one of the plurality of entities comprising at least one of the entity-specific rules; and
   validate a first EDI document associated with the first one of the plurality of entities by:
      comparing the first EDI document to the first current rule set;
      forwarding the first EDI document to the first one of the plurality of entities if the EDI document matches the first current rule set, wherein the EDI document is validated; and
      returning the first EDI document to a sender if the first EDI document does not match the first current rule set, wherein the first EDI document is invalidated.

3. The system of claim 1, wherein the memory further stores computer usable program code executed by the processor to:
   update the inventory of rules and the pointers in response to a change in the entity-specific rules.

4. A computer program product for determining EDI rules to enforce, comprising:
   a non-transitory computer readable storage medium having computer usable program code embodied therewith, the computer usable program code comprising:
      computer usable program code configured to determine entity-specific rules from corresponding companion guides for each of a plurality of entities;
      computer usable program code configured to express each entity-specific rule in a neutral and machine readable format;
      computer usable program code configured to classify each of the entity-specific rules by determining for each entity-specific rule:
         whether the entity-specific rule is common with at least one other entity-specific rule, or
         whether the entity-specific rule is similar to at least one other entity-specific rule, Or
         whether the entity-specific rule is unique;
      computer usable program code configured to convey results of classifying the entity-specific rules by:
         creating an inventory of rules, the inventory including a common set of rules for the plurality of entities;
         dynamically adjusting said inventory of the rules based upon the entity-specific rules where the entity specific rules are derived from a plurality of companion guides, each companion guide associated with one of the plurality of entities;
         storing the inventory of rules in a storage according to the classification of each rule as common, similar, or unique;
         creating a respective, corresponding pointer to the entity-specific rules in the inventory of rules associated with at least one of the plurality of entities; and
         storing the corresponding pointer in a storage for use in retrieving an appropriate current rule set when validating an EDI document for the at least one of the plurality of entities.

5. The computer program product of claim 4, further comprising:
   computer usable program code configured to determine a first current rule set for a first one of the plurality of entities comprising at least one of the entity-specific rules; and
   computer usable program code configured to validate a first EDI document associated with the first one of the plurality of entities by:
      comparing the first EDI document to the first current rule set;
      forwarding the first EDI document to the first one of the plurality of entities if the EDI document matches the first current rule set, wherein the EDI document is validated; and
      returning the first EDI document to a sender if the first EDI document does not match the first current rule set, wherein the first EDI document is invalidated.

6. The computer program product of claim 4, further comprising:
   computer usable program code configured to update the inventory of rules and the pointers in response to a change in the entity-specific rules.

7. A system for validating EDI documents comprising:
a computer system having a processor, a memory, a storage device, a network interface, and a bus for exchanging information therebetween, the memory storing computer usable program code executed by the processor to:
provide an inventory of all rules, the inventory including a common set of rules for a plurality of entities;
dynamically adjust the inventory of all rules based upon entity specific rules where the entity specific rules are derived from a plurality of companion guides, each companion guide associated with one of the plurality of entities;
create a rules analyzer to analyze content of the plurality of companion guides and to build an organizer of companion guide rules;
employ the organizer of companion guide rules to add companion guide rules to the inventory of all rules;
create a profiles engine to create a respective, current rule set for each of said plurality of entities;
create a companion guide profile for each of the plurality of entities where each companion guide profile indicates that entity's companion guide rules and provides pointers to the rules in the inventory of all rules that are associated with the respective, current rule set of that entity, and
create a runtime checker engine to validate an EDI document by comparing the EDI document to the respective, current rule set associated with a corresponding one of the plurality of entities, by forwarding the EDI document to the corresponding one of the plurality of entities if the EDI document matches its current rule set, wherein the EDI document is validated and by returning the EDI document to a sender if the EDI document does not match the respective, current rule set, wherein the EDI document is invalidated.

8. The system of claim 7, wherein the memory further stores computer usable program code executed by the processor to:
create a portal Web page to permit an entity to access, to review and to modify its companion guide profile.

9. The system of claim 7, wherein the memory further stores computer usable program code executed by the processor to:
store the companion guide profiles and the inventory of all rules.

10. The system of claim 7, wherein when creating a rules analyzer to analyze content of companion guides and to build an organizer of companion guide, the memory further stores computer usable program code executed by the processor to:
employ a companion guide analyzer that utilizes the organizer of companion guide rules to analyze companion guides for common and different rules and uses this information to create and update the inventory of all rules.

11. The system of claim 7, wherein when creating a profiles engine to create a respective, current rule set for each of said plurality of entities, wherein the memory further store computer usable program code executed by the processor to:
create the respective, current rule set for each of the plurality of entities the first time a corresponding companion guide profile is accessed during validating the EDI document associated with that entity, wherein the respective, current rule set is used subsequently each additional time that the corresponding companion guide profile is accessed.

12. The system of claim 7, wherein the memory further store computer usable program code executed by the processor to:
create a new rule set for a particular one of the plurality of entities when that entity's companion guide profile is updated.

13. The system of claim 7, wherein the memory further store computer usable program code executed by the processor to:
use the rules analyzer and a companion guide analyzer to analyze each companion guide rule in a particular companion guide to determine whether that companion rule is identical to another rule in the inventory of all rules, or similar to another rule in the inventory of all rules, or not found in another rule in the inventory of all rules.

14. A computer program product for validating EDI documents comprising:
a non-transitory computer readable storage medium having computer usable program code embodied therewith, the computer usable program code comprising:
computer usable program code configured to provide an inventory of all rules, the inventory including a common set of rules for a plurality of entities;
computer usable program code configured to dynamically adjust the inventory of all rules based upon entity specific rules where the entity specific rules are derived from a plurality of companion guides, each companion guide associated with one of the plurality of entities;
computer usable program code configured to create a rules analyzer to analyze content of the plurality of companion guides and to build an organizer of companion guide rules;
computer usable program code configured to employ the organizer of companion guide rules to add companion guide rules to the inventory of all rules;
computer usable program code configured to create a profiles engine to create a respective, current rule set for each of said plurality of entities;
computer usable program code configured to create a companion guide profile for each of the plurality of entities where each companion guide profile indicates that entity's companion guide rules and provides pointers to the rules in the inventory of all rules that are associated with the respective, current rule set of that entity, and
computer usable program code configured to create a runtime checker engine to validate an EDI document by comparing the EDI document to the respective, current rule set associated with a corresponding one of the plurality of entities, by forwarding the EDI document to the corresponding one of the plurality of entities if the EDI document matches its current rule set, wherein the EDI document is validated and by returning the EDI document to a sender if the EDI document does not match the respective, current rule set, wherein the EDI document is invalidated.

15. The computer program product of claim 14, further comprising:
computer usable program code configured to create a portal Web page to permit an entity to access, to review and to modify its companion guide profile.

16. The computer program product of claim 14, further comprising:
computer usable program code configured to store the companion guide profiles and the inventory of all rules.

17. The computer program product of claim 14, wherein the computer usable program code configured to create a rules analyzer to analyze content of companion guides and to build an organizer of companion guide, further comprises:
   computer usable program code configured to employ a companion guide analyzer that utilizes the organizer of companion guide rules to analyze companion guides for common and different rules and uses this information to create and update the inventory of all rules.

18. The computer program product of claim 14, wherein the computer usable program code configured to create a profiles engine to create a respective, current rule set for each of said plurality of entities, further comprises:
   computer usable program code configured to create the respective, current rule set for each of the plurality of entities the first time a corresponding companion guide profile is accessed during validating the EDI document associated with that entity, wherein the respective, current rule set is used subsequently each additional time that the corresponding companion guide profile is accessed.

19. The computer program product of claim 14, further comprising:
   computer usable program code configured to create a new rule set for a particular one of the plurality of entities when that entity's companion guide profile is updated.

20. The computer program product of claim 14, further comprising:
   computer usable program code configured to use the rules analyzer and a companion guide analyzer to analyze each companion guide rule in a particular companion guide to determine whether that companion rule is identical to another rule in the inventory of all rules, or similar to another rule in the inventory of all rules, or not found in another rule in the inventory of all rules.

* * * * *